(12) United States Patent
Schwan

(10) Patent No.: US 6,253,265 B1
(45) Date of Patent: Jun. 26, 2001

(54) REINITIALIZATION CIRCUIT FOR A DATA COMMUNICATIONS INTERFACE

(75) Inventor: Martin A. K. Schwan, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/516,270

(22) Filed: Feb. 29, 2000

Related U.S. Application Data

(63) Continuation-in-part of application No. 09/144,156, filed on Aug. 31, 1998.
(51) Int. Cl.[7] .................................................... G06F 13/00
(52) U.S. Cl. ........................ 710/100; 710/126; 710/131
(58) Field of Search ................................. 710/100, 126, 710/129, 131, 132, 101; 709/221, 222; 326/30; 364/240

(56) References Cited

U.S. PATENT DOCUMENTS 4,734,909 * 3/1988 Bennett et al. ...................... 370/85

* cited by examiner

Primary Examiner—Ario Etienne
(74) Attorney, Agent, or Firm—McDonnell Boehnen Hulbert & Berghoff

(57) ABSTRACT

A method and apparatus for reinitializing a galvanically isolated bus by clearing the bus when it is locked up. The reinitialization circuit monitors the state of the bus and recognizes when the bus is locked up in an artificial active state by timing the duration of this state. When the bus has been in an active state beyond a specified threshold time, the reinitialization circuit drives a selected set of bus lines to an idle or ground state. In another embodiment, a comparator detects any desynchronized condition across the bus interface. In one representative embodiment, the circuit may be incorporated into a bus connecting a link layer device to a physical layer device that is in communication with an IEEE 1394 interface.

29 Claims, 13 Drawing Sheets

REINITIALIZATION CIRCUIT FOR A DATA COMMUNICATIONS INTERFACE

This application is a continuation of Ser. No. 09,144,156 filed Aug. 31, 1998 pending.

BACKGROUND OF THE INVENTION

A. Field of the Invention

This invention relates generally to data communications interfaces and, more particularly, relates to ways for reinitializing the data flow across an interface that is galvanically isolated.

B. Description of Related Art and Problem Solved by the Invention

Data communication interfaces, such as data buses or networks, allow machines such as computer systems, disc drives, printers, and other equipment to exchange information. The machines connected to an interface typically communicate according to a common standard, which invariably defines requirements of the interface control and driver hardware. A common hardware constraint is to require galvanic isolation of the machines to increase immunity to noise on the ground plane of the system and to prevent electrical shock to a user connecting machines at different electrical potentials.

A typical data communication interface is the IEEE 1394-1995 bus system ("IEEE 1394") which is discussed in an article entitled "IEEE Standard for a High Performance Serial Bus" published by the IEEE, which is incorporated by reference herein. The IEEE 1394 is also referred to in the industry as Firewire™. FIG. 1 shows an implementation of a connection to an IEEE 1394 interface using a physical layer device 20 connected to a link layer device 22 by an interface bus 24 device a physical layer device to a link layer device. The physical layer 20 and the link layer device 22 are galvanically isolated by isolation capacitors 26. Resistors 25 and 27 20 provide proper terminating impedance of the bus lines 24 on either side of the galvanic barrier. It should be understood that the physical layer 20 and link layer devices 22 are in different ground domains.

One problem with the capacitive galvanic isolation barrier is that only time varying signals can pass across the isolation barrier. Thus, constant or D.C. signals asserted on one side of the isolation barrier do not continue to influence signals on the other side of the barrier after they have passed through the isolation barrier. Due to the high input impedance of a device in the receive state on the other side of the barrier (i.e. the device is not diving the line), the line is undriven and can drift to an incorrect logic level.

Techniques, however, exist for ensuring valid logic states on the input of the device. Typically, a form of a voltage limiting circuit, such as a bus holder 30, on each bus line 24 can effectively "square up" the pulses that are transmitted across the isolation capacitor 26. While the bus holder may address some problems, it may also introduce other problems. For example, round noise may actually cause the bus holder 30 of bus 24 to hold one or more bus lines at an incorrect logic level. The noise on the bus 24 may be mistaken by the bus holder 30 as a change in logic level. The bus holder 30, mistakenly responding to the noise on the ground as a change in logic level, will hold the bus lines at an incorrect logic level.

If the bus holder mistakenly holds the control lines of the bus 24 at an incorrect logic if state, the bus may become "locked up" and unable to communicate. It has been observed that a specific cause of the lock up in the case of an IEEE 1394 interface is that the devices can interpret the interface to be active when it is actually idle. For example, a logic high state on a control line between the physical layer device 20 and the link layer device 22 may indicate that the physical layer device 20 is active and has control of the interface. In the IEEE 1394 interface, the busy physical layer device 20 causes the link layer device 22 to relinquish control of the interface. The link layer device 22 will not request control of the interface while the control lines 24 indicate the physical layer device is holding the interface. Thus, a problem may arise if the bus holder 30 mistakenly sets the control lines on the link layer device 22 side of the isolation capacitor 26 after a sequence of state transitions that indicate it is holding the interface when it actually is not holding the interface. While the control lines are at the active logic state, the link layer device 22 will interpret the physical layer device 20 to be active when it is actually idle, and further communication with the physical layer device 20 will not be attempted. The Link device 22 will not attempt further communications until the control lines arc returned to the idle state. The system is thus locked up and unable to communicate.

While subsequent data or control activity from the physical layer device may drive a locked line to an idle state and thus reset the interface, the first sequence of data may be lost or corrupted. In addition, narrow duration pulses on the Physical-Link Layer interface bus may be incapable of driving a locked line to an idle state due to the decay time response of the bus 24. FIG. 2 illustrates the inability of narrow pulses to reset the interface. The link layer side 23 of the bus 24 is incorrectly at a logic 1 of high voltage level 33. A narrow pulse 31 on the physical device side 21 of the bus 24 will manifest itself as a transition 41 above the logic 1 level on side 23. A short duration signal bounce 35, however, is not sufficient to cross the threshold 37 for the bus holder 30 to drag the line down to the logic 0 level 56. Instead, the bus line 24 remains at the incorrect logic 1 level 33 and the interface remains locked up. A longer duration pulse will force the incorrectly held side to the correct level because, during the pulse the bus holder will bring the momentary transition above logic level 1 back to the proper logic level 1 voltage. The subsequent high to low transition on the physical layer device side will result in the link layer device side following correctly.

The net result is that the data flow between the physical layer device 20 to the link layer device 22 can become "locked up", i.e., render inoperative communications between the Physical and Link layer devices.

SUMMARY OF THE INVENTION

Accordingly, an object of the present invention is to provide a reinitialization circuit for a galvanically isolated data communications interface.

Another object of the invention is to provide an improved bus system for linking physical and link layer devices, which has a reinitialization circuit that prevents communications form being interrupted across the interface in the event that a logic level inconsistency across the isolation barrier occurs after power-up of the devices.

Yet another object of the invention is to provide a method for reinitializing a galvanically isolated data communications interface.

These and other objects of the invention are achieved in a reinitialization circuit for a bus having one more control lines and/or data transmission lines. This is accomplished, in accordance with a primary aspect of the invention, by means of a reinitialization circuit with connections to the bus lines. The structure and operation of several embodiments of the reinitialization circuit is described in more detail below.

The reinitialization circuit has at least one line detector for monitoring the state of the data transmission and/or control lines, at least one timer coupled to the line detector, and a switching network connected to the outputs of the timer. During proper operation of the interface, there is a maximum time during which control lines are in a valid active state. A control line remaining in an active state longer than the maximum time, is indicative of a locked up interface bus. Thus, an automatic resetting of the lines to the idle state after exceeding a specified threshold time of supposed activity will ensure that the devices will not remain locked up in an incorrect active state. Alternatively, an inconsistency in logic levels across the isolation barrier is indicative of a locker up interface bus.

In response to the line detectors detecting the bus in an active state for a time exceeding the specified threshold time, the switching network drives a selected group of the bus lines to an idle state. Once driven to the idle state, the bus lines are reinitialized, allowing data communications to resume across the bus.

In one representative embodiment, the bus connects Physical and Link layer devices interfaced to an IEEE 1394 bus. The bus has two control lines, which are monitored by the line detector. If the control lines remain in the active "hold" state beyond the threshold time limit measured by the timer, the system assumes that the interface is in a desynchronized condition. In response, the switching network clears the control lines by momentarily driving them to their idle state. In this embodiment, it may also be advisable to clear the data lines for the bus and the Physical side of the LREQ control line so as to guarantee that the link to physical communication will not be interrupted if reinitialization occurs before the next packet of data is sent over one of the data lines.

In an alternate embodiment, the control lines can be monitored and a resyncbronization or asymmetrical condition detected by comparing the state of the control lines on opposite sides of the isolation barrier. In this embodiment, the circuit has at least one line detector for monitoring the state of the data transmission and/or control lines, at least one opto-coupler used to prevent a conduction path circumventing the isolation barrier, at least one timer coupled to the output of the receive side buffer, a comparator made up of one or more logic gates coupled to the transmit side of a capacitive isolation barrier and to the receive side of a capacitive isolation barrier, and a switching network connected to the output of the logic gate. During proper operation of the interface, the logic levels on either side of a capacitive isolation barrier are monitored. Allowing time for the signal to settle to the receiver side, the circuit corrects the asymmetry by driving the appropriate lines to the appropriate logic levels. Thereby ensuring that the devices will not remain locked up in an incorrect logic state.

These and other features of the invention will be described in more detail in conjunction with the description of presently preferred embodiments of the invention. Persons skilled in the art will readily appreciate from the disclosure herein that the invention can be practiced in other bus environments. Further, the constriction of the timer, the switching circuits, and line detectors circuits may vary from the illustrated embodiments.

BRIEF DESCRIPTION OF THE DRAWINGS

A presently preferred embodiment of the present invention is described herein with reference to the drawings, wherein like reference numerals refer to like elements in the various views, and in which.

DETAILED DESCRIPTION OF THE PREFERRED AND ALTERNATIVE EMBODIMENTS OF THE INVENTION

Figure 1:
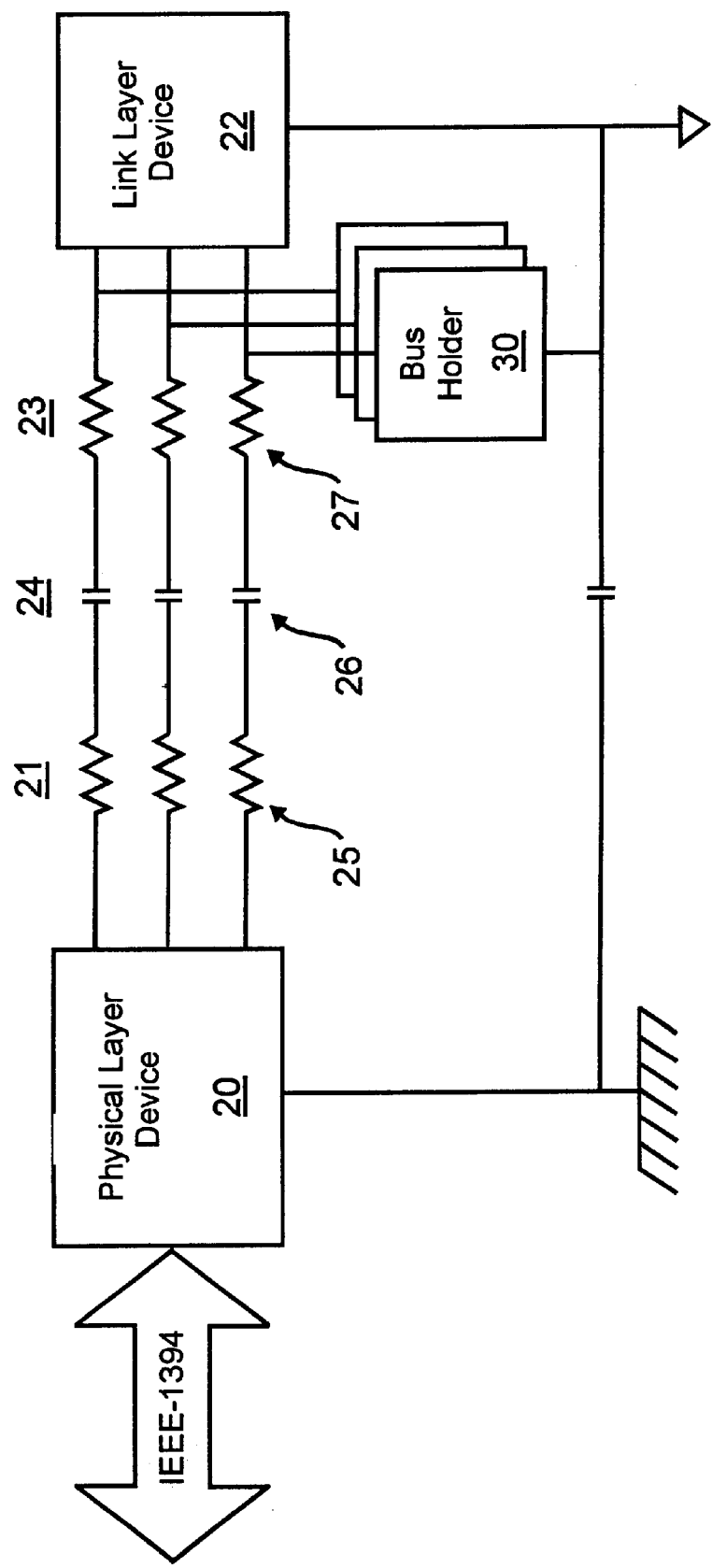
FIG. 1 is a schematic diagram of a prior art galvanically isolated bus interface.
Figure 2:
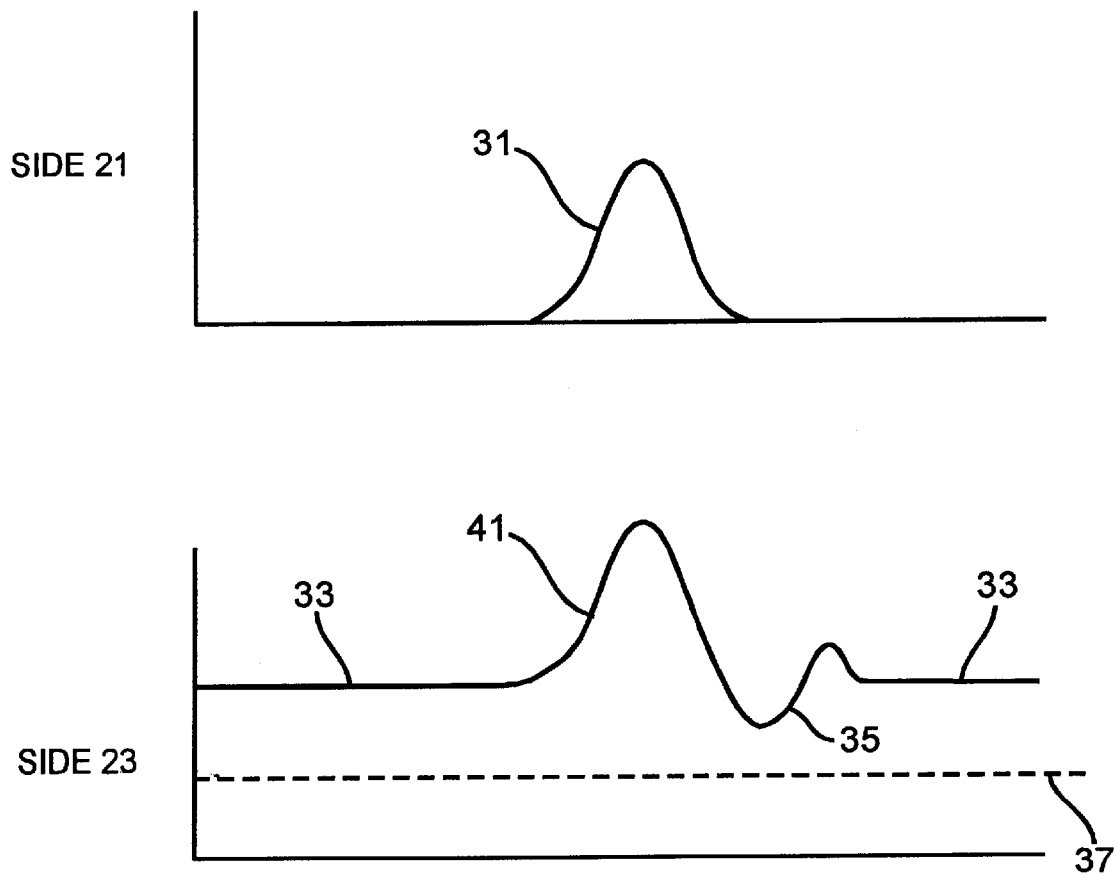
FIG. 2 is a prior art timing diagram of a narrow pulse not capable of resetting the bus interface of FIG. 1.
Figure 3:
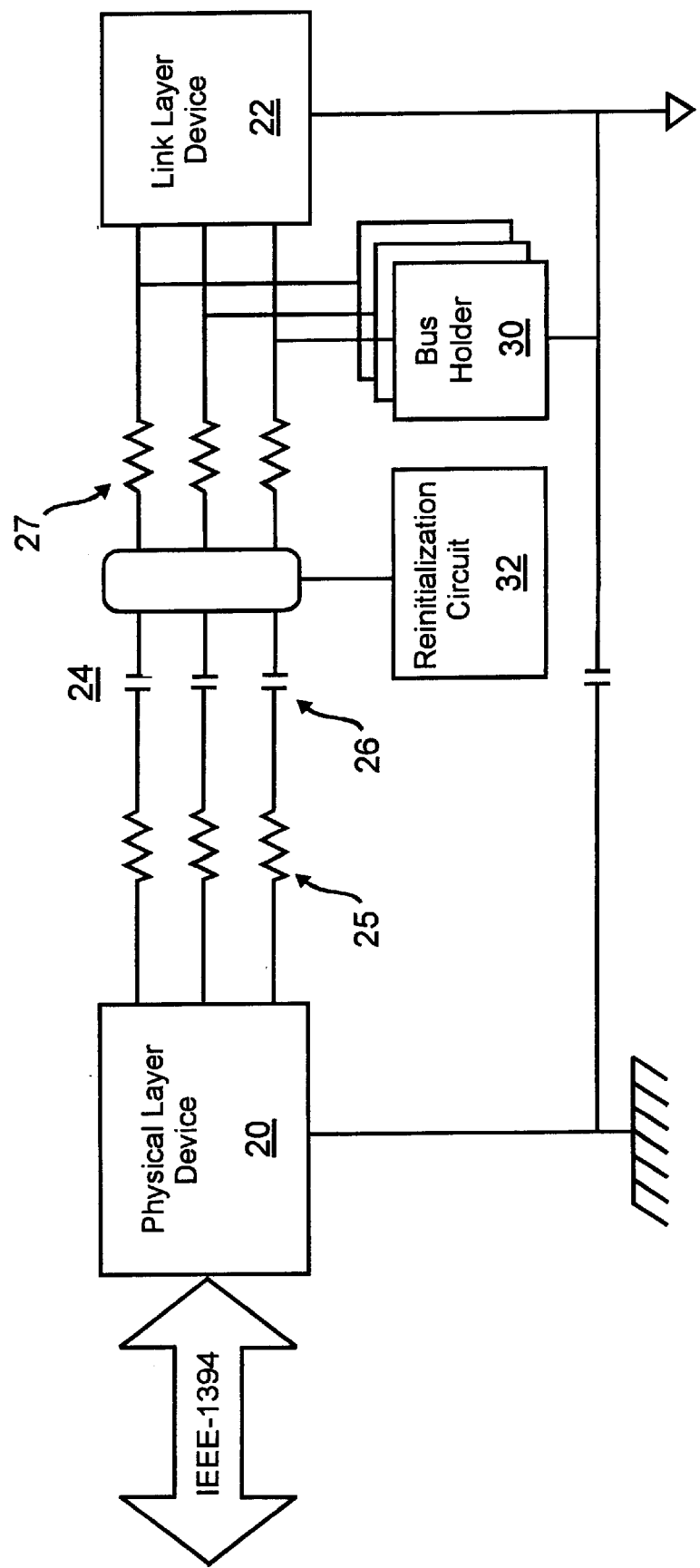
FIG. 3 shows a diagram of a galvanically isolated bus interface and a reinitialization circuit in accordance with the invention.

Referring to FIG. 3, a device and method is provided for reinitializing a galvanically isolated communications bus 24 having a plurality of data and/or control lines. The method comprises the steps of monitoring a selection of bus lines, timing how long the monitored lines remain in an active state, and momentarily clearing the monitored lines when they are active for a time period exceeding a specified threshold value. Exceeding the time threshold value is indicative of the monitored lines being desynchronized or no longer in the same state as the bus interface on the other side of the barrier. The monitored bus lines may include a control line or lines and/or data transmission lines. Clearing the monitored line and perhaps other bus lines, such as data communication lines, results in a reestablishment of data flow across the bus 24. Clearing the lines depends on the particular bus and may comprise driving a select set (or subset) of the lines to a common state such as ground. The particular lines to be monitored may vary in a accordance with the particular data communications interface, but will typically be either one or more control lines, one or more data lines, or a combination of control and/or data lines. In FIG. 1, the circuitry that is used for performing the line monitoring, timing, and clearing functions is shown as a reinitialization circuit 32.

Figure 4:
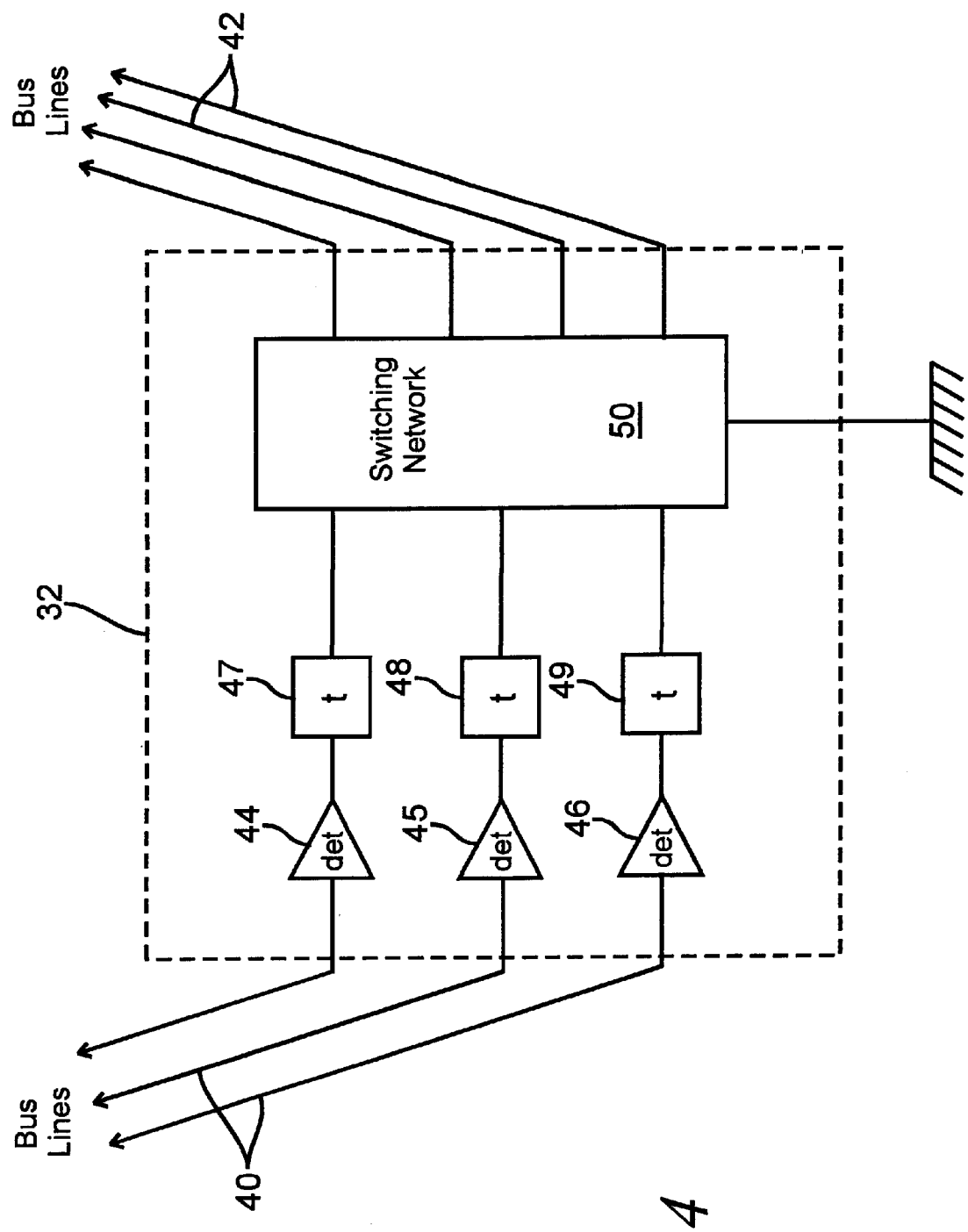
FIG. 4 is a block diagram of a preferred form of the reinitialization circuit and the bus interface of FIG. 1.

Referring now to FIG. 4, a reinitialization circuit 32 for practicing this reinitialization method is depicted. The reinitialization circuit 32 has a set of inputs 40 and a set of outputs 42. The inputs 40 connect to a first selection of the bus lines 24 of FIG. 3, and the outputs 42 connect to a second selection of bus lines 24, which may be the same bus lines as the lines monitored by inputs 40. The reinitialization circuit 32 includes at least one line detector, shown for illustration purposes as three line detectors 44, 45, 46 for three bus lines 24 (FIG. 3) that have outputs coupled to corresponding timers 47, 48, 49 which are, in turn, coupled to a switching network 50. The input of each line detector 44, 45, 46 connects to one of the first selection of bus lines 24 (FIG. 3) and monitors the state of the bus line, determining if the bus line is an active, e.g., high, or idle state. The output of each line detector 44, 45, 46 is coupled to the input of a timer 47, 48, 49 which measures the length of time its corresponding bus line 44, 45, 46 is in an active state. Should a line detector 44, 45, 46 return to the idle state, the corresponding timer 47, 48, 49 is reset. The timers 47, 48, 49 are set up to respond according to the maximum time which the particular interface may experience valid communication activity. The maximum time may vary from system to system but can be determined by those of skill in the art. A maximum time that the physical layer device cannot be validly be active can be determined by a timeout period of several seconds or much less depending on the particular interface.

The outputs of the timers 47, 48, 49 are coupled to the inputs of a switching network 50. The switching network 50 responds when at least one of the timers 47, 48, 49 measures that its corresponding bus line 44, 45, 46 has been in an active state for longer than a specified threshold time. The response of the switching network 50 is to drive the outputs 42 to an idle state, e.g., low logic state, and hence driving the second selection of bus lines 24 (FIG. 3) to the idle state. In typical interfaces, such as the IEEE 1394 interface, the idle state for a data communications line corresponds to a low logic state or ground voltage potential 52, however, the switching network may be configured to drive a line to any chosen voltage potential by methods well known to those in the art. The first and second selection of lines coupled to inputs 40 and outputs 42, respectively may be the same lines, or different. For example in the IEEE 1394, the inputs 42 could be connected to the control 0 and control 1 lines and the outputs 25 could be connected to either the control 0 and control 1 lines, all of the data lines for the bus, the line request line LREQ, or a combination of these lines depending on the particular bus 24.

Figure 5:
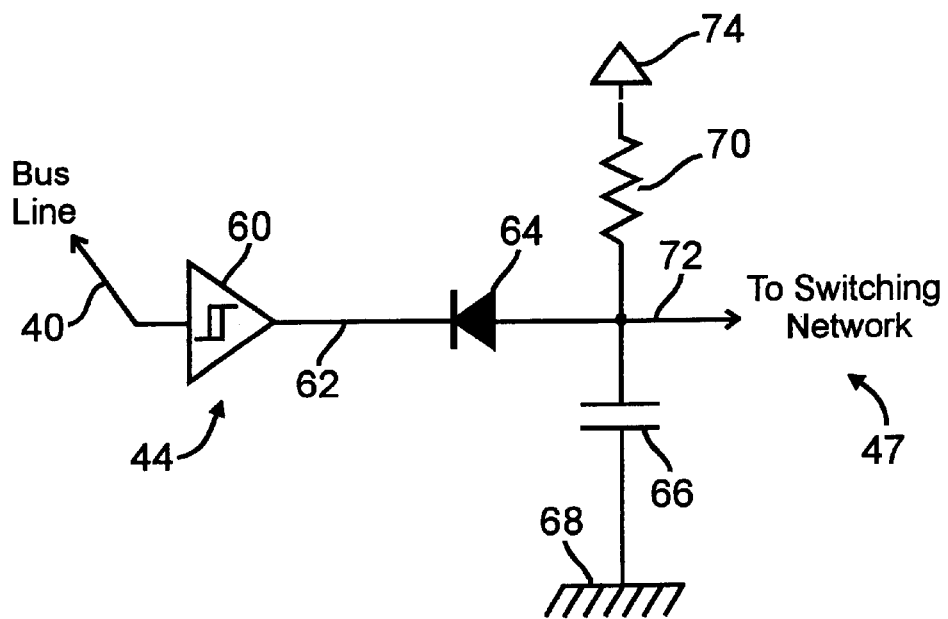
FIG. 5 is a circuit diagram of one embodiment of a line detector and a timer of FIG. 4.

FIG. 5 shows an illustrative embodiment of a line detector 44 and timer 47. A line detector 44 comprising a Schmitt trigger 60 drives line 62 to a low state in response to an idle state on the input 40 from a bus line 24 (FIG. 3). The timer 47 comprises a RC circuit 66, 70 and a diode 64. The low state on line 62 removes any charge on capacitor 66 by conducting the charge to ground 68 through diode 64. Thus, the output 72 of the timer is at ground potential 68 in an idle state of its data communications line coupled to input 61. When the data communications line coupled to input 40 is in an active state, however, line 62 is driven to a high state, the diode 64 does not conduct, and capacitor 66 is charged from a high potential 74 through resistor 70. The potential on the timer 47 output rises towards the high potential with a timing constant determined by the values of the RC circuit 66, 70. If the data communications line coupled to input 40 returns to the idle state then the capacitor 66 is rapidly discharged through the diode 64, thus resetting the timer 47. The other line detectors and timers of FIG. 4 may be the same as the embodiment of FIG. 5.

Figure 6:
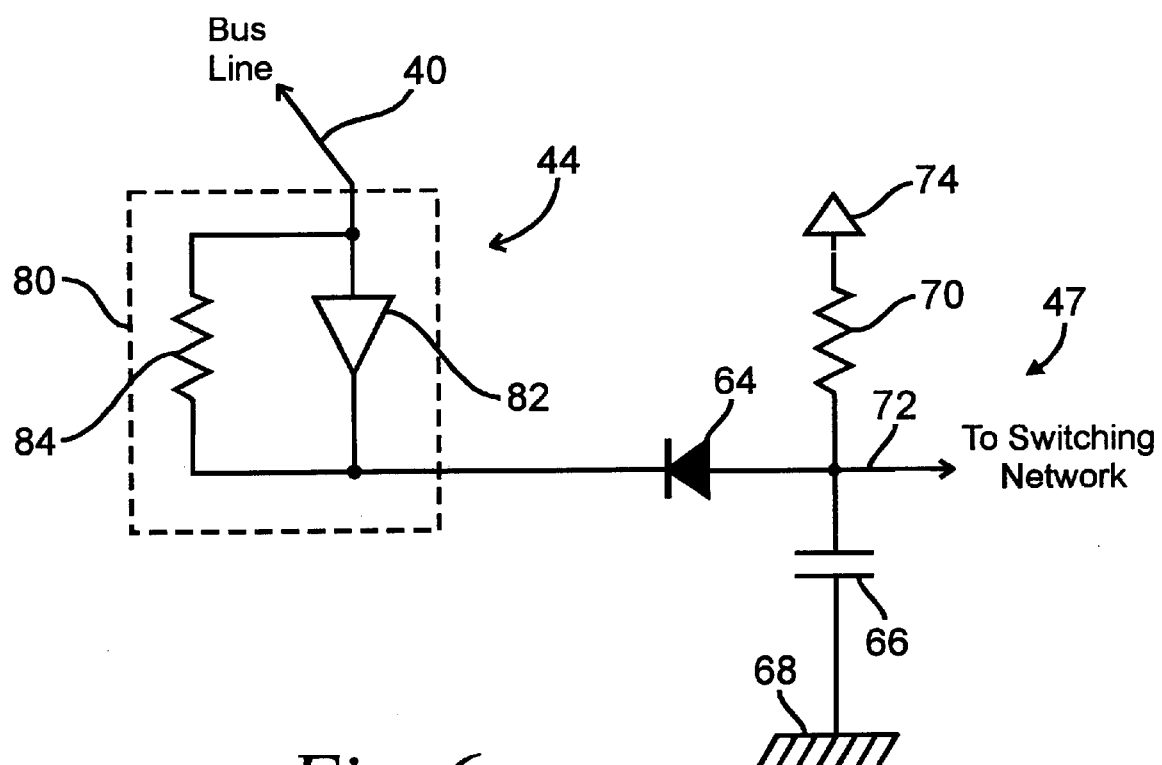
FIG. 6 is a circuit diagram of an alternative embodiment of a line detector and a timer of FIG. 4.

An alternative embodiment of the line detector and timer, illustrated in FIG. 6, comprises a bus holder circuit 80 comprising an amplifier 82 with a resistor placed across the input and output of the amplifier 82. The bus holder 80 can be the same bus holder also used for squaring up the pulse. The output of the bus holder circuit 80 is coupled to a timer circuit 32 having the same construction as the embodiment of FIG. 5. The bus holder 80 may be incorporated into the reinitialization circuit and may be arranged as a set of bus holders, each connected to group of data communication lines comprising a third selection of data communications lines. The third selection of data communications lines could, of course, comprise all the data communications lines in the interface.

Figure 7A:
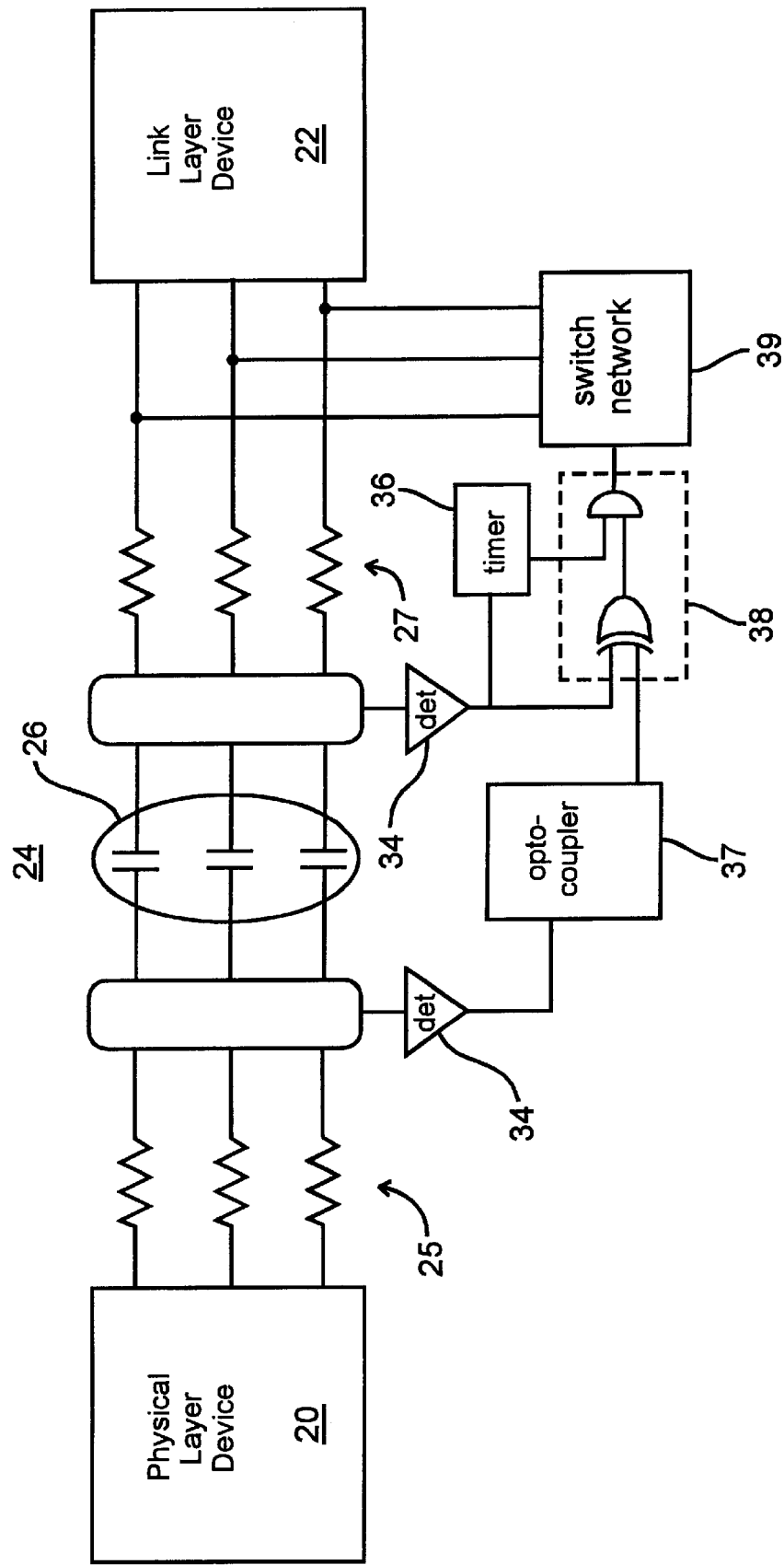
FIG. 7A is a diagram of an alternative embodiment of a detector.

FIG. 7A shows an alternate embodiment of a line detector 34 and timer 36 using an another approach to detecting the asymmetry of the bus interface 24. Rather than monitoring the bus lines for a time period of inactivity as previously described, the line detector 34 detects and compares the bus signal levels on either side of the isolation barrier 26. The line detector 34 detects the signal levels of the bus line on one side of the isolation barrier compares it to the signal level detected on the other side of the isolation barrier. A comparator 38, made up of one or more logic gates, such as an XOR coupled to an AND gate, is used to detect a difference in the detected static signal levels. In a properly functioning bus interface 24, the signal levels on both sides of the isolation barrier 26 are the same. If the signal levels on both sides of the isolation barrier are not the same, an asymmetric condition exists indicating that the bus interface is desynchronized. It should be understood that the line detector 34 should also include an isolation device, preferably an opto-coupler 37, to prevent a conduction path circumventing the isolation barrier 26. The means of isolation for the detector should not itself be subject to becoming asymmetrical but, it may be much slower than the capacitive barrier of the bus interface data and control lines. A timer 36, is used to overcome any signal propagation delay through the opto-coupler. Once a transition is detected at the output of the receive side, a certain amount of time must elapse before the output of the comparator is valid, allowing time for the signal to propagate through the opto-coupler.

Figure 7B:
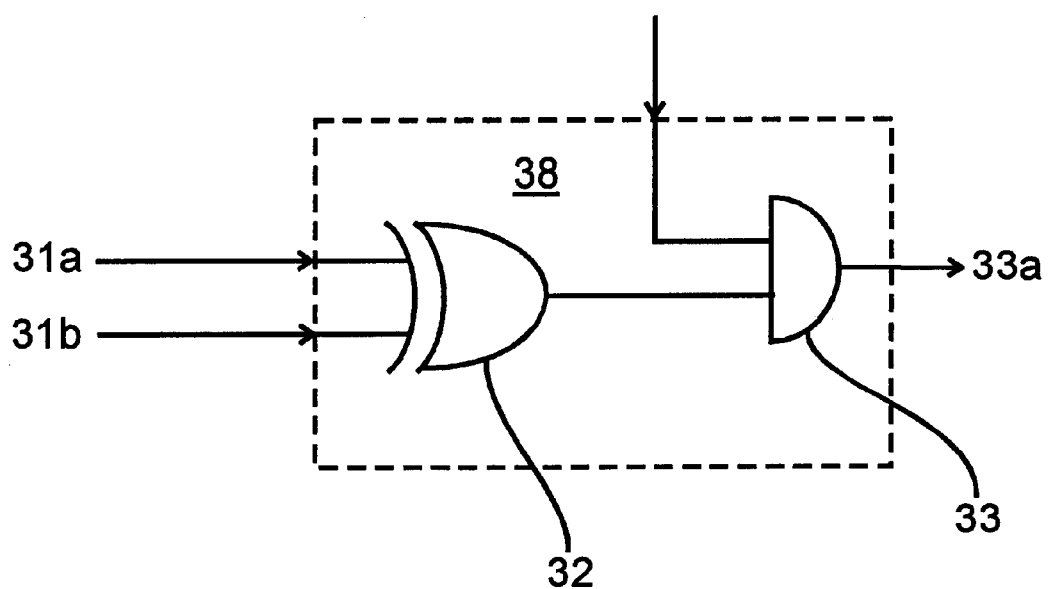
FIG. 7B is a diagram of an embodiment of a comparator of FIG. 7A.

Referring now to FIG. 7B, shown is an embodiment of the comparator 38 used to compare the logic levels on both sides of the isolation barrier. The comparator 38 can be made up of one or more logic gates, such as an XOR gate 32 coupled to an AND gate 33. In this example, the XOR gate 32 is used to compare the logic levels on both sides of the isolation barrier 26. The XOR gate 32 has a logic 0 output if both of its inputs 31A, 31B are the same level and a logic 1 output if its inputs 31A, 31B are different levels. The retriggerable timer 36 has an output of logic 0 when a level transition is detected at the output of the receive side until a fixed amount of time has elapsed, then the output is logic 1. The output of the timer 36 and the output of the XOR gate 32 are both inputs to the AND gate 33. If both inputs to the AND gate 33 are logic 1, that is the interface is desynchronized or asymmetric, the switch circuit 39 drives the receive side 27 of the interface to the opposite level or the initial state, whichever is appropriate.

One such embodiment of the switching network 39 illustrated in FIG. 7A is used to drive the receive side 27 of the interface to the opposite level or the initial state, which ever is appropriate for the desynchronized condition. The comparator 38 is used to detect the difference in signal levels and outputs to the switching network 39. Thus, if the switching network 39 receives an output from the comparator 38, i.e.

a high or low logic level, the switching network 39 will respond accordingly by driving the receive side 27 of the interface to the opposite logic level, driving the receive side 27 of the interface to an initial state, or making no change to the logic levels.

Figure 8:
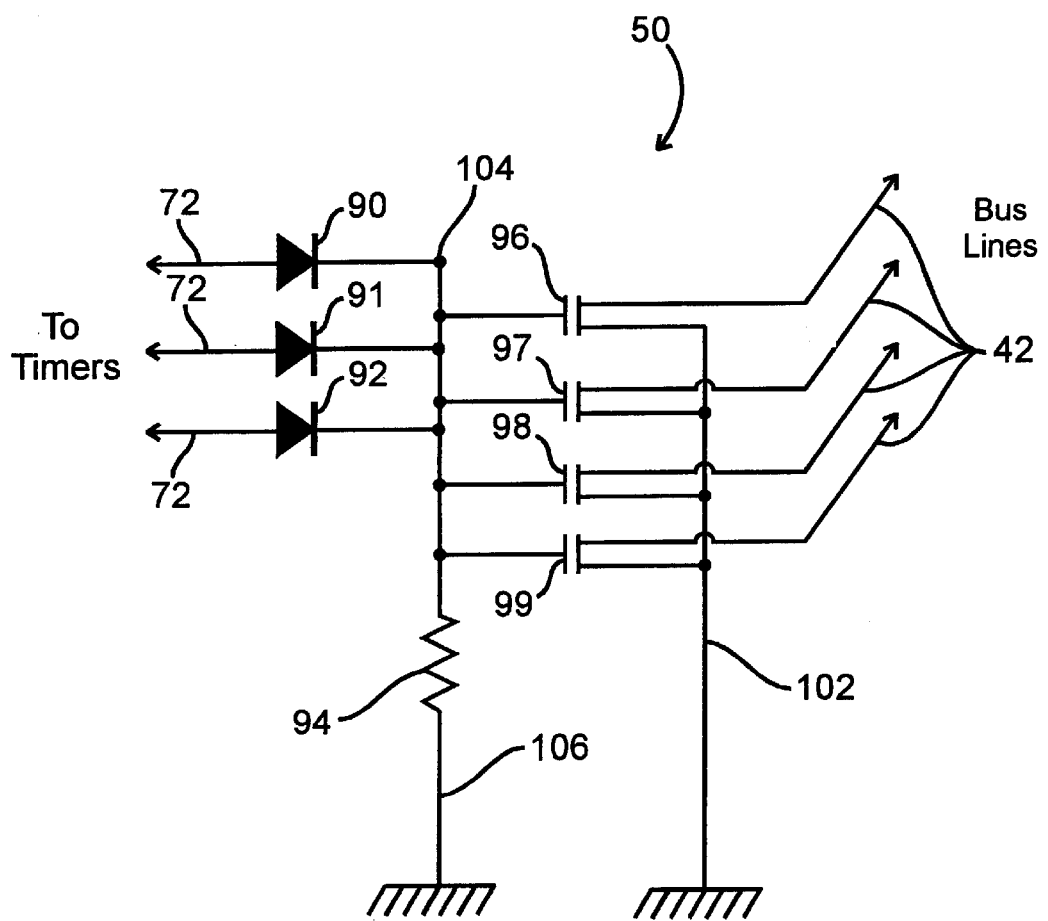
FIG. 8 is a circuit diagram of one embodiment of the switching network of FIG. 4.

One embodiment of the switching network 50 of FIG. 4 is illustrated in FIG. 8. The outputs of the timers of FIGS. 4–6 are connected to a common line 104 through diodes 90–92. The diodes 90–92 maintain independence of the potentials on the outputs of the timers. The common line 104 connects to ground 106 through a resistor 94 and also connects to the gates of field effect transistors 96–99. When one of the timer outputs is at a sufficiently high potential, the potential on the common line 104 will exceed the threshold potential for conduction of the transistors 97–99. The transistors 97–99 will conduct and will drive the outputs 24 of the reinitialization circuit to ground potential 102. The specified threshold time for clearing the data communications lines is when this conduction occurs and is determined by the values of the components of the timing circuit and the switching network. Once at least one of the inputs 40 to the line detectors is in an active state for longer than the specified threshold time, the switching network 50 will drive the second selection of bus lines coupled to the outputs 42 to the ground potential. In this manner, the bus lines are driven to an idle state, here the ground potential, and the interface is reinitialized.

Figure 9:
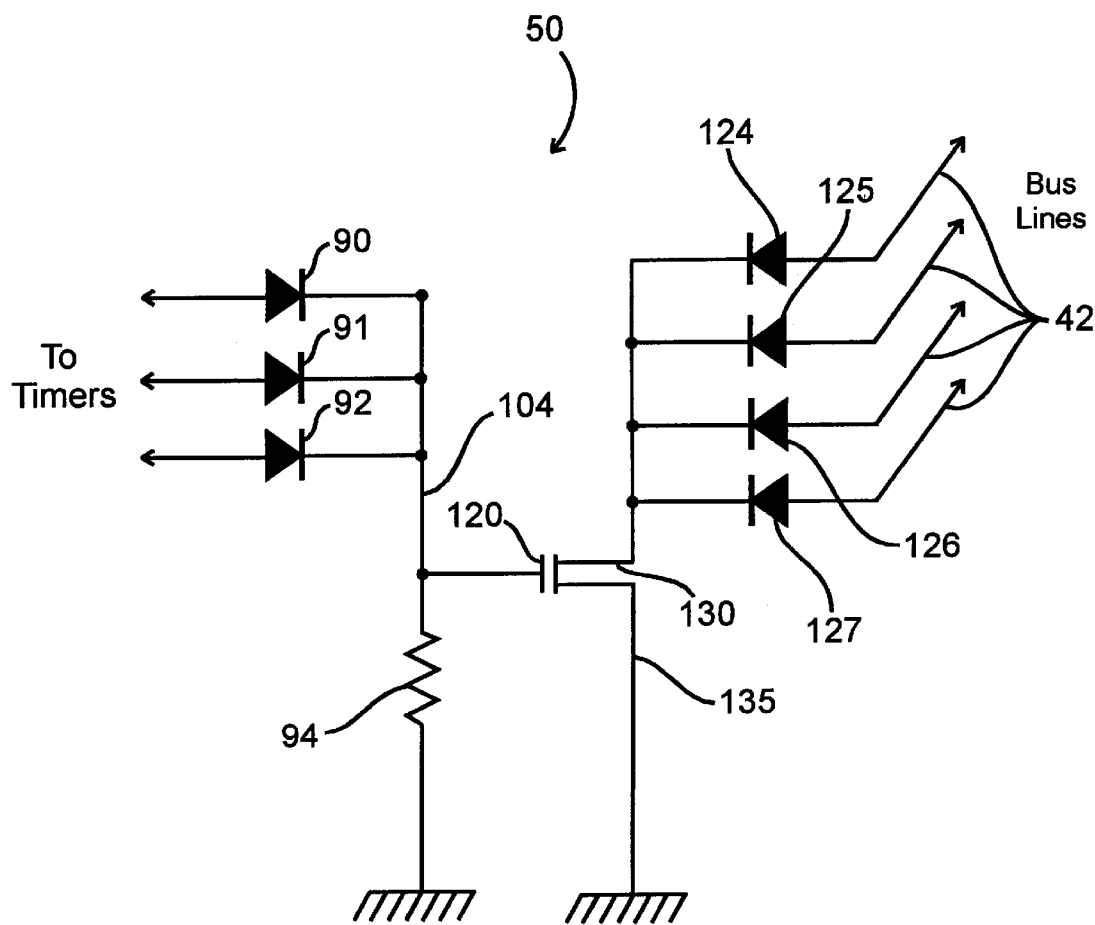
FIG. 9 is a circuit diagram of an alternative embodiment of the switching network of FIG. 4.

Shown in FIG. 9 is an alternative embodiment of the switching network 50. Similarly, the outputs of the timers connect to a common line 104 through diodes 90, 91, 92. In this embodiment there is only one field effect transistor 120, whose drain 130 drives the outputs of the reinitialization circuit to ground potential 135 through diodes 124–127 when the potential on the common line 114 exceeds the threshold potential for conduction of the transistor. The diodes 124–127 maintain the independence of the signals on the data communications lines.

Additional possible embodiments of the switching network can be constructed by those skilled in the art from the present disclosure, including the use of logic gates and integrated circuitry in place of the transistors and diodes. Moreover, a possible modification of the switching network can accommodate an interface whose idle state is not a common ground potential to the second selection of data communications lines, but any combination of potentials on those lines. More generally, the reinitialization circuit may comprise discrete components incorporated on the printed circuit board for the system, or, they may be incorporated into the Physical or Link layer devices, or may be embodied in a programmable logic device (PLD) by methods well known to those in the art. The invention may also be modified to incorporate with tri-state logic devices. More generally, monitoring can be as simple as timing how long one line remains at a specific voltage, or as complex as keeping track of history of all the transitions of all of the bus interface lines with a state machine that interprets the sequences of transitions to determine if the state is valid. The latter can easily be incorporated into the link or physical layer devices which typically already have such state machines, although, not for this purpose. Such an implementation would need to include the switching devices that momentarily drive the bus lines to the initial idle state.

Figure 10:
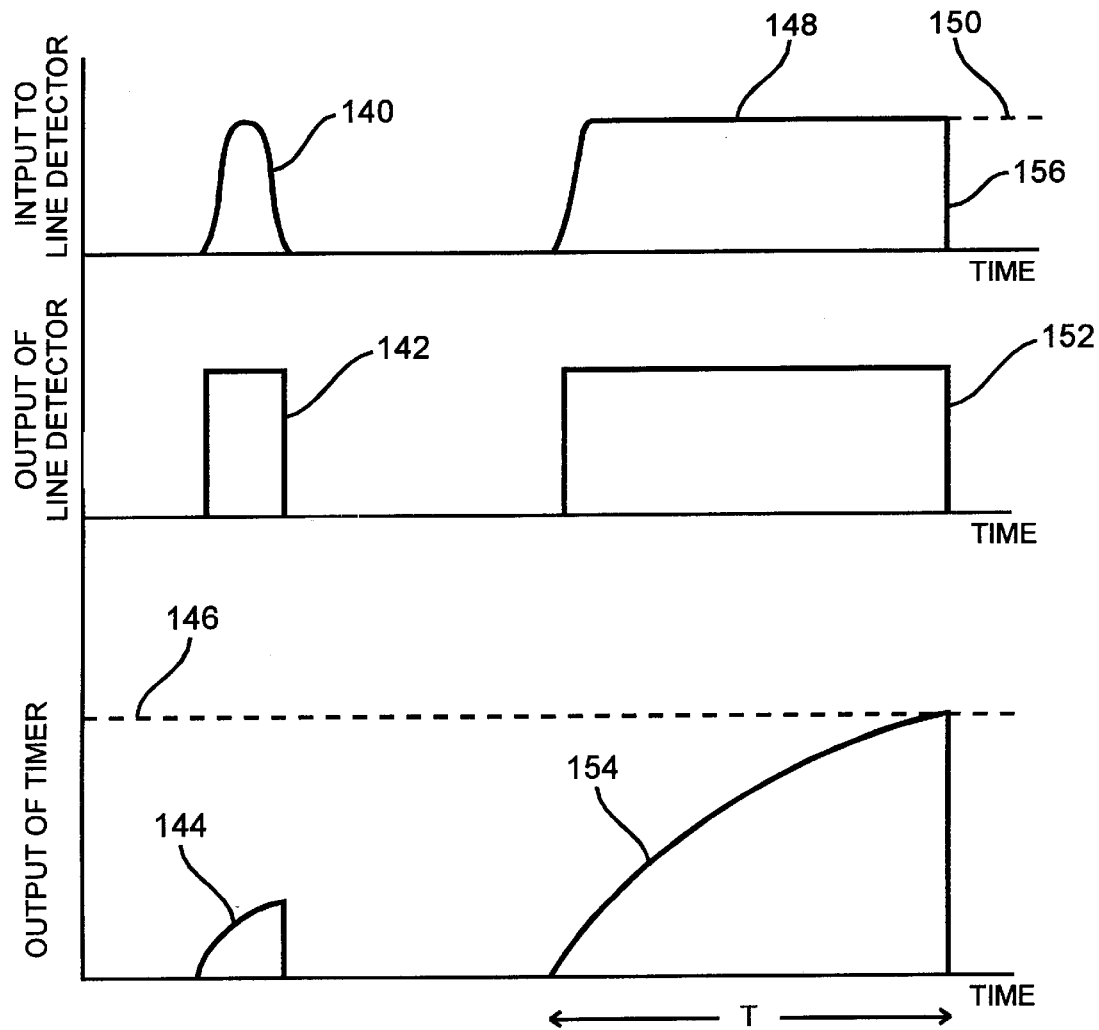
FIG. 10 is a timing diagram the operation of one embodiment of the reinitialization circuit of FIGS. 1 and 4.

FIG. 10 illustrates the timing of an embodiment of the reinitialization circuit in operation. Referring to FIG. 10 in combination with FIGS. I and 4, in normal operation of the bus 24, a data pulse 140 at the input to a line detector 44 is transformed to a valid logic state 142 at the output of the line detector 44. The potential 144 at the output of the corresponding timer 47 rises until the timer is reset when the input of the line detector 44 returns to the idle state. When the data communications line is locked up, however, the bus line is in an artificial active state 148. The line would remain in this state 150 were it not for the reinitialization circuit 50. The output potential 152 of the line detector activates the timer 47, whose output potential 154 rises until it reaches the threshold potential 146 for triggering the switching network. This occurs after the timer has been active for the specified threshold time T. The output of the switching network 50 drives the potential 156 on the data communications line(s) coupled to the outputs 42 to the idle state momentarily, also grounding the output of the line detector and resetting the timer.

Figure 11:
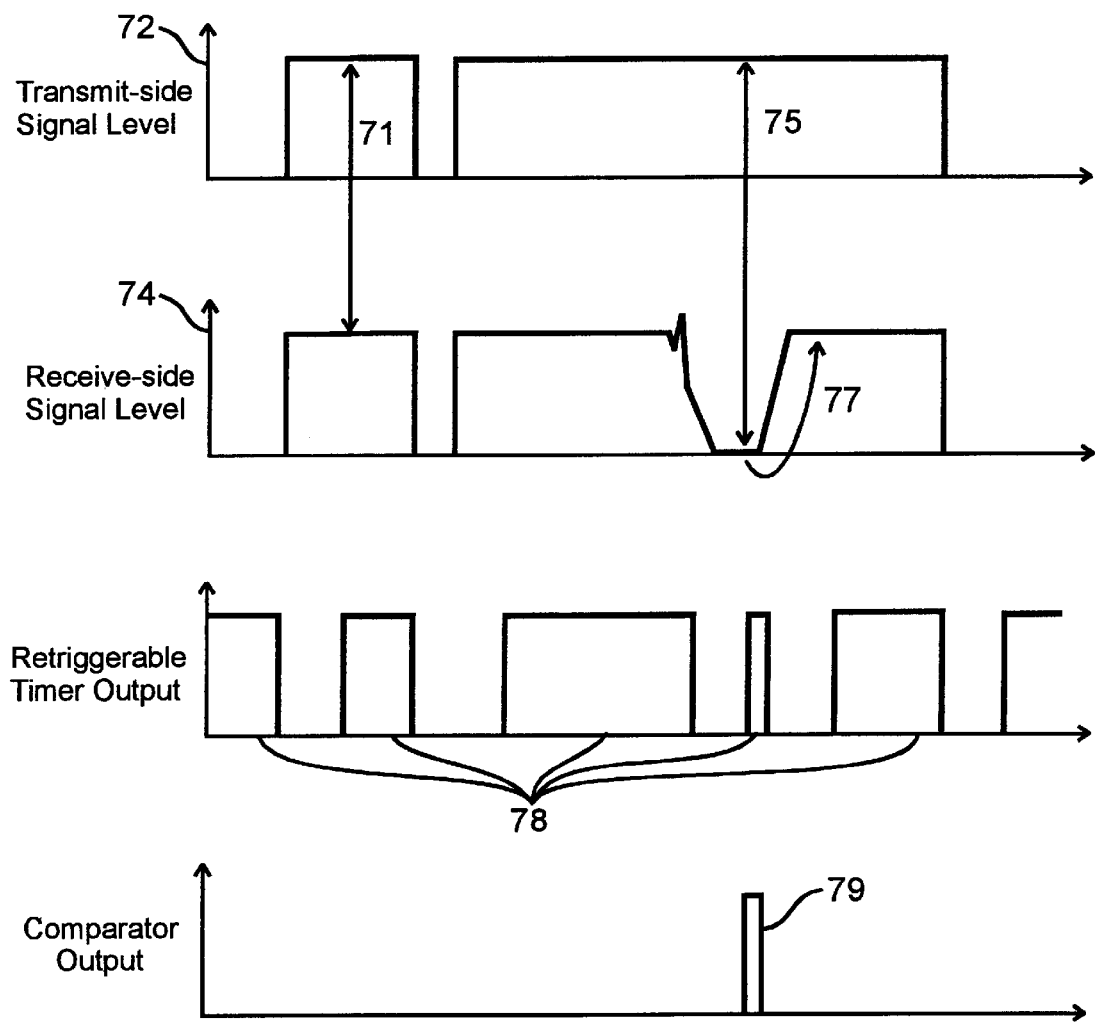
FIG. 11 is a timing diagraming the operation of one embodiment of the reinitialization circuit of FIGS. 7A and 7B.

In order to overcome a disabling asymmetrical interface, it is helpful to keep in mind the time limits of valid disabling states. However, in one such preferred method, the timing as illustrated in FIG. 11 from a reinitialization circuit shown in FIG. 7A does not require prior knowledge of the time limits of valid disabling states. In normal operation, the logic level of the transmit side and the receive side of the galvanic separator are the same 71. FIG. 11 is an example when the two sides, the transmit-side 72 and the receive-side 74, are asymmetrical 75, that is the two sides do not share the same logic level. In this example, the timer 36 outputs a logic 0 when a transition 78 is detected. After a fixed amount of time the timer 36 outputs a logic 1, signaling to the comparator that the transmit side logic level should be equal to the receive side logic level. When the two sides are asymmetric, the comparator outputs a signal 79 to the switch network that in turn drives the receive side of the interface to the opposite level 77 or initial state, which ever is appropriate.

In an embodiment in which a bus is reinitialized, the first selection of lines to be monitored by the line detectors 28 includes those designated the Control 0 and Control 1 lines, the LREQ line, in combination with the data transmission lines Data 0, Data 1, Data 2 and Data 3. The second selection of data communications lines to be cleared to an idle state may include the above designated lines or indeed any combination of data communications lines. A preferred embodiment would be monitoring the Control 0 and Control I lines, the LREQ line, the other control lines, and the four data lines. The reinitialization circuit may be incorporated into the bus electronics to provide an improved IEEE 1394 bus system.

Figure 12:
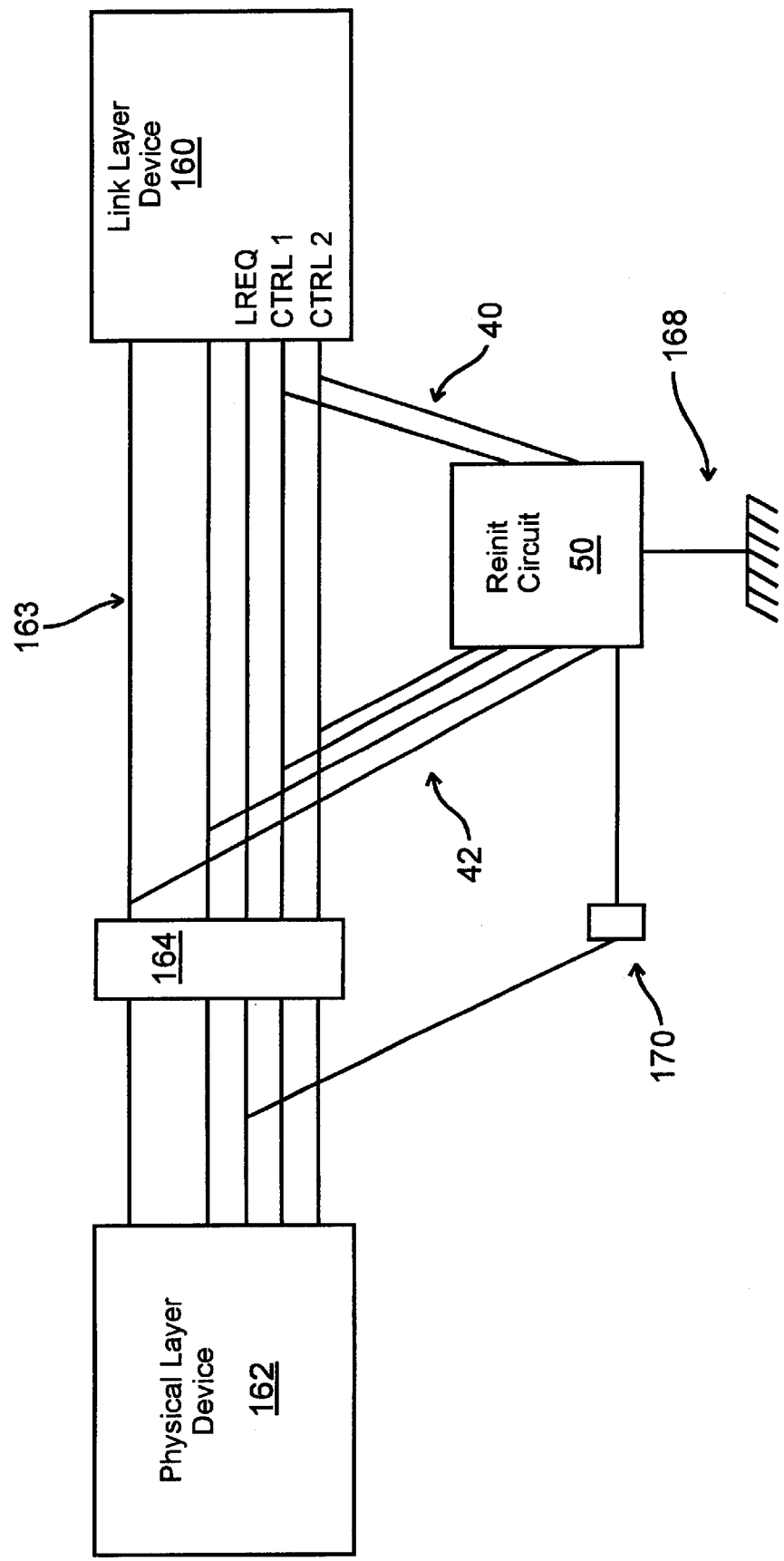
FIG. 12 is a block diagram of one embodiment of an improved bus having the reinitialization circuit features of the present invention.

An improved bus system is illustrated in FIG. 12. The system has a set of devices including a link device 160 and physical device 162 connected by a set of bus lines 163 with galvanic isolation 164. While the galvanic isolation has been described as a capacitor, it may also be embodied by other means of isolation such a transformer or optical isolation. Additional circuitry, such as the bus holders, has been omitted from FIG. 12 for purposes of explanation and clarity. A reinitialization circuit 50 as described above has inputs 40 connected to the Control 0 and Control 1 lines of the Link layer device. If either of these lines is at a high voltage potential for greater than a specified threshold time, for example 125 microseconds in a particular example, the outputs of the circuit 42 will drive a selection of the bus lines to the ground potential 168. This will clear the locked bus and reestablish data flow between the two layers. In the example, the lines momentarily driven to ground potential include the Control 0 and Control 1 lines, the data lines Data 0, Data 1, Data 2 and Data 3, and the physical layer device 162 side of the LREQ line. The reinitialization circuit 50 output to reset the physical layer device 162 side of LREQ is also shown as isolated through the use of an optical isolation device 170.

Figure 13:
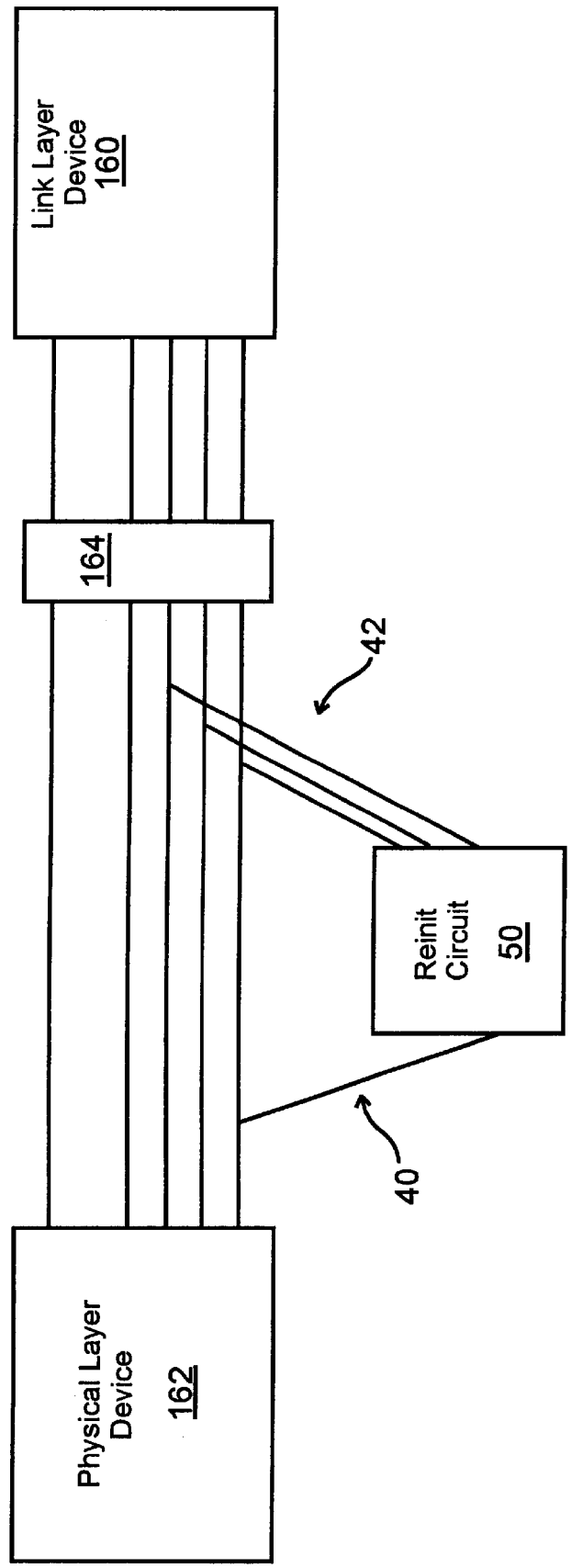
FIG. 13 is a block diagram of an alternative embodiment of an improved bus having the reinitialization circuit features of the present invention.

Similarly, an alternative embodiment of an improved bus system is illustrated in FIG. 13. In this embodiment, the input 40 of a reinitialization circuit 50 as described above is connected to the LREQ line and Control 0 and I lines from the physical layer device 162. The outputs 25 of the circuit 36 drive a selection of the bus lines 20 to ground potential as before, such as the LREQ lines, Control 0 and Control I lines, and/or the data lines on the physical layer device 162 side of the galvanic isolation 164. With the IEEE-1394 interface, lock up of the system due to the desynchronization of the LREQ line from the link layer device is not a problem, but such a configuration may be necessary with other device protocols.

The present embodiments provide a bus interface with galvanic isolation that monitors and detects the state of the bus to determine when the bus has become locked up and unable to communicate. When it is detected that the bus is locked up, the reinitialization circuit drives the bus to an idle or reset state to allow data communications to resume.

From the foregoing detailed description, it will be appreciated that numerous modifications and changes may be made to the methods and circuit elements of the invention without departing from the spirit and scope of the invention. This true scope and spirit is defined by the appended claims, to be interpreted in light of the foregoing.

I claim:

1. In a communications bus having a set of bus lines, a reinitialization circuit comprising:
   at least one line detector coupled to a first selection of said set of bus lines;
   at least one timer coupled to said at least one line detector;
   a comparator coupled to said first selection of said set of bus lines and a second selection of said set of bus lines; and
   a switching network having an input coupled to said at least one timer and an output coupled to said second selection of said set of bus lines;
   wherein the switching network drives the second selection of said set of bus lines to an idle state in response to said comparator detecting a difference in logic levels between a bus line in said first selection of said set of bus lines and a bus line in said second selection of said set of bus lines.

2. A reinitialization circuit as claimed in claim 1 wherein the comparator comprises an XOR logic gate.

3. A reinitialization circuit as claimed in claim 1 wherein the comparator comprises an AND logic gate.

4. A reinitialization circuit as claimed in claim 1 wherein the line detector comprises a Schmitt trigger.

5. A reinitialization circuit as claimed in claim 1 wherein the line detector comprises a bus holder.

6. A reinitialization circuit as claimed in claim 1 wherein the timer comprises a RC circuit.

7. A reinitialization circuit as claimed in claim 4 wherein the timer further comprises at least one diode.

8. A reinitialization circuit as claimed in claim 1 wherein the switching network comprises at least one field effect transistor.

9. A reinitialization circuit as claimed in claim 1 wherein the switching network comprises at least one diode.

10. A reinitialization circuit as claimed in claim 1 wherein the switching network comprises at least one logic gate.

11. A reinitialization circuit as claimed in claim 1 wherein the idle state comprises a ground potential of a data communications interface.

12. A reinitialization circuit as claimed in claim 1 wherein said communications bus comprises a third selection of said set of bus lines and wherein the reinitialization circuit further comprises one or more bus holders for the third selection of said set of bus lines.

13. A reinitialization circuit as claimed in claim 12 wherein the third selection of said set of bus lines comprises data communication lines.

14. A reinitialization circuit as claimed in claim 12 wherein said set of bus lines provide communications to an IEEE 1394 bus.

15. A reinitialization circuit as claimed in claim 14 wherein the first selection of said set of bus lines comprises Control 0 and Control 1 lines.

16. A reinitialization circuit as claimed in claim 14 wherein the first selection of said set of bus lines comprises a LREQ line.

17. A reinitialization circuit as claimed in claim 16, wherein said set of bus lines comprise a plurality of data transmission lines and at least three control lines, and wherein said second selection of said set of bus lines comprises said plurality of data transmission lines and at least one of said control lines.

18. A reinitialization circuit as claimed in claim 17, wherein said control lines comprise Control 0, Control 1 and LREQ lines, and wherein the second selection of said set of bus lines comprises said plurality of data transmission lines and said Control 0, Control 1 and LREQ lines.

19. A reinitialization circuit as claimed in claim 14 wherein a threshold time is at least 125 microseconds.

20. In a data processing system having an architecture with a first device and a second device connected there between by a bus system comprising a set of galvanically isolated bus lines, an improvement to said bus system comprising:
   at least one line detector having an input and an output, the input of the line detector connected to a first selection of said set of bus lines;
   at least one timer having an input and an output with the timer input connected to the output of said at least one line detector;
   a comparator coupled to the first and a second selection of said set of bus lines; and
   a switching network having an input commonly connected to the output of the timer and at least one output connected to said second selection of said set of bus lines;
   wherein the switching network drives the second selection of said set of bus lines to an inactive state in response to the comparator detecting a difference in logic levels between said first selection of said set of bus lines and said second selection of said set of bus lines.

21. A bus system as claimed in claim 20 further comprising a plurality of bus holders wherein each bus line of said set of bus lines is connected to a corresponding bus holder.

22. A bus system as claimed in claim 20 wherein said at least one line detector comprises a Schmitt trigger.

23. A bus system as claimed in claim 20 wherein said at least one line detector comprises a bus holder.

24. A bus system as claimed in claim 20 wherein said at least one timer comprises a RC circuit.

25. A bus system as claimed in claim 20 wherein said at least one timer further comprises at least one diode.

26. A bus system as claimed in claim 20 wherein the switching network comprises at least one field effect transistor.

27. A bus system as claimed in claim 20 wherein the switching network comprises at least one diode.

28. A bus system as claimed in claim 20 wherein the first selection of said set of bus lines comprises the bus lines designated Control 0 and Control 1 under the IEEE 1394 standard.

29. A bus system as claimed in claim 20 wherein the first selection of said set of bus lines comprises the bus line designated to LREQ under the IEEE 1394 standard.

\* \* \* \* \*